Sept. 19, 1933.     A. GETZLOFF     1,927,739
BRAKE TESTING DEVICE
Filed April 10, 1931     2 Sheets-Sheet 1
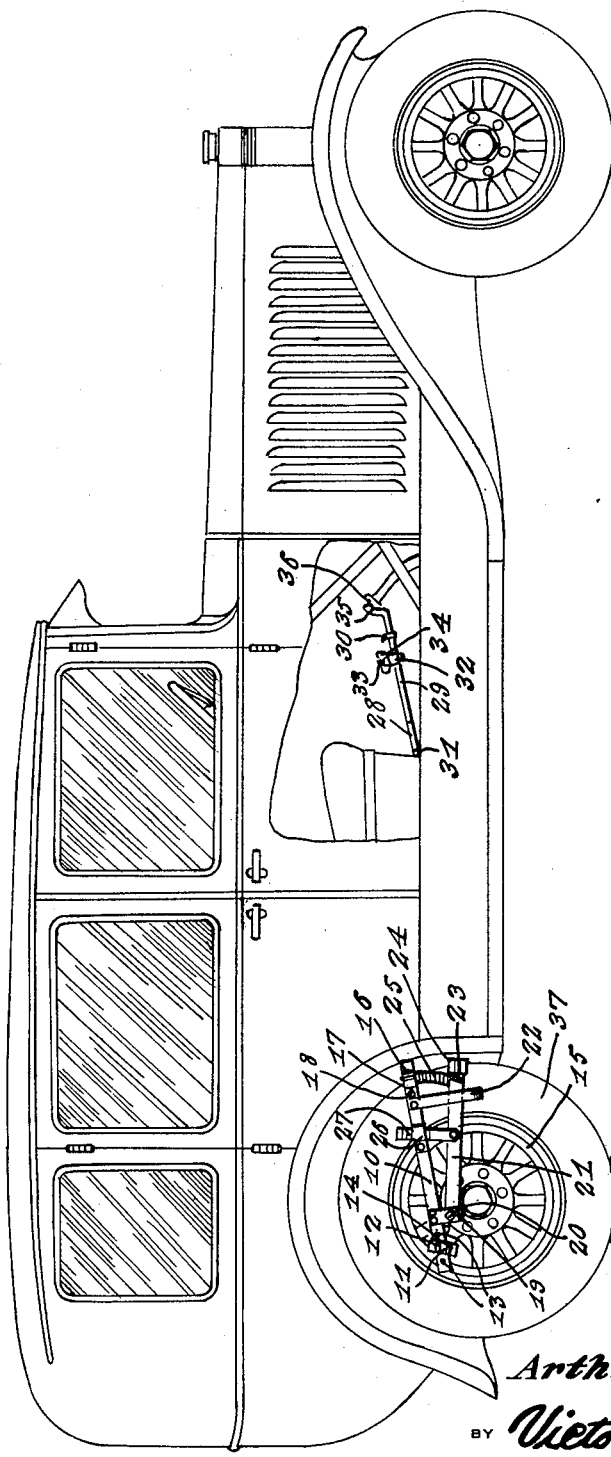

Sept. 19, 1933.  A. GETZLOFF  1,927,739
BRAKE TESTING DEVICE
Filed April 10, 1931  2 Sheets-Sheet 2
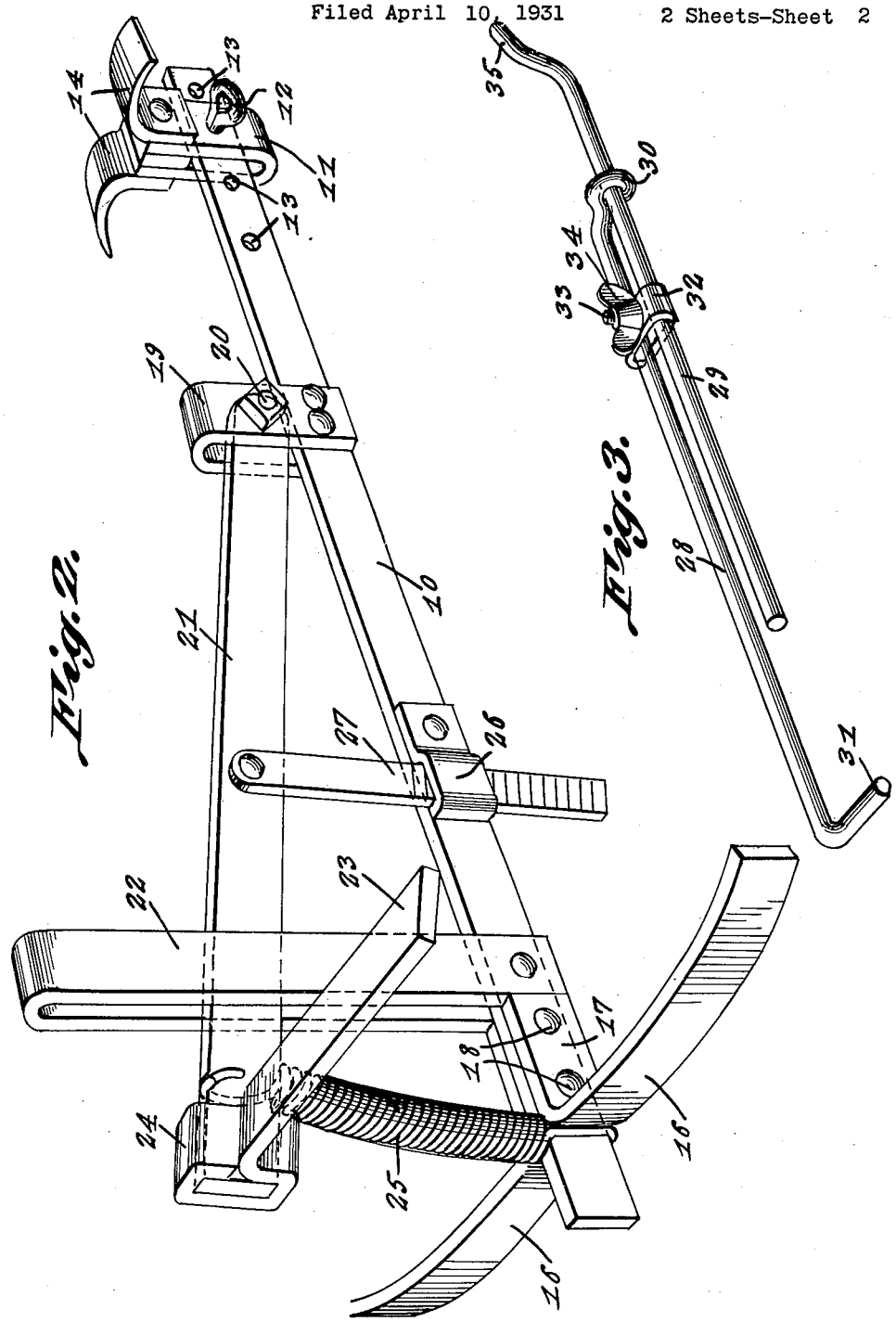
Arthur Getzloff, INVENTOR
BY Victor J. Evans
and Co.  ATTORNEYS Patented Sept. 19, 1933

1,927,739

UNITED STATES PATENT OFFICE 1,927,739

BRAKE TESTING DEVICE

Arthur Getzloff, Harris, Mich.

Application April 10, 1931. Serial No. 529,249

5 Claims. (Cl. 265—1)

The present invention contemplates the provision of a brake testing device, primarily constructed for use in connection with vehicle wheels, and by means of which the brakes for the various wheels of the vehicle can be properly and uniformly adjusted, with a minimum of time and effort.

In carrying out the invention I contemplate the provision of a device for the above mentioned purpose which can be quickly and easily associated with the vehicle wheel whose brake is to be tested, and removed therefrom as the occasion may require, and capable of being easily and conveniently manipulated to accomplish the desired results.

The nature and advantages of the invention will be better understood when the following description is read in connection with the accompanying drawings, the invention residing in the construction, combination and arrangement of parts as claimed.

In the drawings forming part of this application like numerals of reference indicate similar parts in the several views and wherein:

Figure 1 is a side elevation of a vehicle partly broken away, showing how the invention is used.

Figure 2 is a perspective view of the device removed from the wheel of the vehicle.

Figure 3 is a detail view of the brake holding means.

The device forming the subject matter of the present invention essentially comprises an arm 10 which may vary in length, and which carries at one end means for connecting the arm with the spokes of the wheel, while supported on the opposite end of the arm are elements adapted to engage the periphery of the wheel. In the specific embodiment of the invention herein illustrated, I preferably employ a substantially U-shaped bracket 11 which is slidably associated with the arm 10, and held fixed with relation thereto by means of a cotter pin 12 adapted to be passed through the bracket and through one of the plurality of openings 13 formed in the adjacent end of the arm 10. This construction permits the bracket 11 to be adjusted longitudinally of the arm to be properly positioned for use with vehicle wheels of different diameters. Carried by the bracket 11 are oppositely curved hooks 14 adapted to engage a spoke of the wheel 15 at a point directly behind the hub of the wheel, when the device is used for the purpose intended, and as clearly illustrated in Figure 1. Supported by the opposite end of this arm 10 are curved elements 16 adapted to singly engage the periphery of the tire or wheel of the vehicle. Each element 16 is provided with an attaching portion 17 which is secured to the arm by suitable bolts 18. These elements project from the opposite sides of the arm 10, so that the device can be conveniently used on either side of the vehicle as will be readily understood.

Supported by the arm 10 at an appropriate point in its length is a bracket 19 upon which is fulcrumed as at 20 a lever 21, the latter operating in a substantially U-shaped guide 22 also supported by the arm 10 adjacent its outer end. The lever is provided with a handle 23, one end of which is formed with a loop 24 slidably fitted on the adjacent end of the lever, so that the handle 23 can be reversed for use with wheels on either side of the vehicle. Connecting the arm 10 and lever 21 is a coil spring 25.

Carried by the arm 10 is a guide 26 through which slides a gauge arm 27 which is used in the manner to be presently described.

In Figure 3 I have illustrated a brake holding means which preferably includes a pair of spaced parallel rods 28 and 29 respectively, the former having an offset extremity terminating to provide an eye 30 through which the rod 29 slides. The opposite end of the rod 28 is offset as at 31. The rods 28 and 29 have associated therewith a suitable clamp 32 including a bolt 33 and a wing nut 34, which when tightened holds the rods 28 and 29 fixed relatively against sliding movements. The forward end of the rod 29 is also offset as at 35 to be used in the manner illustrated in Figure 1.

In practice, the nut 34 is loosened to permit relative sliding movements of the rods 28 and 29, so that the offset extremity 35 of the rod 29 can be arranged upon the brake pedal 36 of the vehicle, with the offset extremity 31 of the rod 28 arranged against the front seat as illustrated. The brake pedal 36 is then depressed approximately half way, after which the thumb nut 34 is tightened to hold the rods 28 and 29 fixed relatively, and the brake pedal in its depressed condition with the brakes partly applied.

The device illustrated in Figure 2 is then mounted on the wheel of the vehicle, with one of the hooks 14 engaging one of the spokes of the wheel immediately behind the hub thereof, and with one of the elements 16 engaging the periphery of the wheel. If the device is used in connection with automobile wheels, the particular element 16 employed engages the periphery of the tire 37 of the wheel. The lever 21 is then depressed through the instrumentality of the handle 23, until a pull of sufficient force is exerted upon the arm 10 to partly turn the wheel 15. During this operation the gauge arm 27 slides through the guide 26, and when the wheel has been partly turned in the manner just described, the gauge arm 27 is provided with a marking to indicate the tightness or particular condition of the brake being tested. If desired the arm 27 may be provided with graduations for this purpose instead of being marked off with each operation of the device. After the brake on one wheel has been tested in the manner described, the device is removed from the particular wheel, and individually applied to the other wheels of the vehicle to test the brakes thereof accordingly. In this manner it can be readily determined what adjustments, if any, are necessary with a view of having all brakes operate with a uniform pressure on their respective wheels. Manifestly when the device is changed from one side of the vehicle to the other, the handle 23 of the lever 21 can be easily reversed, and the hooks 14 and tire engaging elements 16 used in pairs, depending upon which side of the vehicle the device is being used. The device is not only extremely simple in construction, but one that can be quickly applied to or removed from any particular wheel, and operated with a minimum of time and effort for the purpose intended.

While it is believed that from the foregoing description the nature and advantage of the invention will be readily apparent, I desire to have it understood that such changes may be made when desired as fall within the scope of what is claimed.

What is claimed is:

1. A brake testing device adapted for application to a vehicle wheel comprising an arm adapted to engage a spoke of the wheel, an element rigidly secured to one end of the said arm and projecting transversely therefrom for engagement with the periphery of the wheel, a lever pivoted at a point in the length of said arm, a resilient connection between the arm and the adjacent end of said lever, a handle carried by the lever for operating the latter against the tension of said resilient connection to cause said arm to partly turn said wheel, and means carried by the lever to indicate the force exerted to rotate the wheel.

2. A brake testing device adapted for application to a vehicle wheel comprising an arm, adjustable means mounted on one end of the arm for engaging the spoke of the wheel, means rigidly secured to the opposite end of the arm for engaging the periphery of the wheel, a lever fulcrumed at a point in the length of said arm, a resilient connection between the arm and the free end of said lever, a guide for said lever carried by the arm, a handle for operating said lever against the tension of the resilient connection and to cause the arm to partially rotate the wheel, and means carried by the lever to indicate the force exerted to rotate the wheel.

3. A brake testing device adapted for application to a vehicle wheel, adjustable means supported by one end of the arm for engaging a spoke of the wheel comprising an arm, means carried by the opposite end of the arm for engaging the periphery of the wheel, a lever having one end fulcrumed at a point in the length of said arm, a guide for said lever supported by said arm, a resilient connection between the arm and the free end of said lever, a handle for said lever, whereby the latter is operable against the tension of the resilient connection to cause said arm to partly rotate said wheel, a second guide supported by the arm, and a gauge arm carried by the lever and slidable through said second guide to indicate the force exerted to rotate the wheel.

4. A brake testing device adapted for application to a vehicle wheel comprising an arm, a bracket adjustably mounted on the arm adjacent one end thereof, means for holding the bracket fixed to the arm in a given position, hooks carried by the bracket and adapted to singly engage a spoke of the wheel, means carried by the opposite end of the arm to engage the periphery of the wheel, a lever fulcrumed at one end at a point in the length of the arm, a guide for said lever supported by the arm, a resilient connection between the arm and the adjacent end of said lever, a reversible handle detachably associated with one end of the lever and adapted to operate the latter to cause said arm to partly rotate the wheel, and means carried by the lever to indicate the force exerted to rotate the wheel.

5. A reversible brake testing device adapted for application to a vehicle wheel comprising an arm, an element adjustably mounted on one end of the arm and including a pair of opposed hooks adapted to singly engage a spoke of the wheel, means for holding said element fixed to the arm in a given position, curved elements projecting from the opposite sides of the arm adjacent the other end thereof and adapted to singly engage the periphery of the wheel, a lever fulcrumed at one end at a point in the length of said arm, a guide for said lever carried by the arm, a resilient connection between the arm and the adjacent end of said lever, a reversible handle detachably associated with the free end of the lever and utilized to operate the lever against the tension of the yieldable connection and cause said arm to partly rotate the wheel, and means carried by the lever to indicate the force exerted to rotate the wheel.

ARTHUR GETZLOFF.